United States Patent [19]
Formenti

[11] Patent Number: 6,046,569
[45] Date of Patent: Apr. 4, 2000

[54] SAFETY METHOD AND APPARATUS FOR RESISTIVE START OF ELECTROMOTORS

[75] Inventor: Franco Formenti, Verano Brianza, Italy

[73] Assignee: Veco S.R.L., Giussano (MI), Italy

[21] Appl. No.: 09/124,241

[22] Filed: Jul. 29, 1998

[30] Foreign Application Priority Data

Oct. 8, 1997 [IT] Italy ................................ MI97A2279

[51] Int. Cl.⁷ .................................................. H02P 1/26
[52] U.S. Cl. ........................ 318/778; 318/767; 318/783; 318/812
[58] Field of Search .............................. 361/25, 27, 106; 318/778, 767, 783, 812

[56] References Cited

U.S. PATENT DOCUMENTS

| | | | |
|---|---|---|---|
| 3,555,356 | 1/1971 | Kaiser | 317/13 |
| 3,695,054 | 10/1972 | Barry . | |
| 3,737,752 | 6/1973 | Strachan | 318/471 |
| 3,761,792 | 9/1973 | Whitney et al. | 318/221 E |
| 4,017,778 | 4/1977 | Koch | 318/473 |
| 4,644,239 | 2/1987 | Yoshilawa et al. | 318/641 |
| 4,716,486 | 12/1987 | Sobiepanek et al. | 361/24 |
| 4,743,816 | 5/1988 | Prather . | |
| 5,589,753 | 12/1996 | Kadah et al. | 318/785 |

FOREIGN PATENT DOCUMENTS

| | | |
|---|---|---|
| 2 561 461 | 9/1985 | France . |
| 41 19 007 | 12/1992 | Germany . |

*Primary Examiner*—Robert E. Nappi
*Assistant Examiner*—Rito Leykin
*Attorney, Agent, or Firm*—Young & Thompson

[57] ABSTRACT

The windings of the electromotor at the starting are connected to the main power through starting resistors for a very short period of time, before being directly connected to the main power source.

A voltage is initially established at the terminals of a voltage control resistor provided by at least one of the starting resistors, or a fraction thereof, before the running of the motor will occur and the direct connection of the motor windings to the main power is allowed only when the voltage across the voltage control resistor has decreased with respect to the voltage initially established at the starting of the motor. The temperature difference between the voltage control resistor, or a fraction thereof, and the ambient is also sensed and any new start of the motor will be prevented till the temperature of the control resistor is not adequately decreased.

7 Claims, 1 Drawing Sheet

SAFETY METHOD AND APPARATUS FOR RESISTIVE START OF ELECTROMOTORS

BACKGROUND OF THE INVENTION

The present invention relates to a method and a safety apparatus which allow an electric motor, of single or three phase type, to be operated with a resistive start mode, maintaining a reduced load current at the starting to prevent the same electric motor to be damaged by too many starts in an hour.

It is known that the current (LRA) flowing in the windings of an electric motor when starting, is very high, about 6 times the working current flowing in the same windings during normal operation.

PRIOR ART

One of the systems successfully used to reduce the current at the starting of an electric motor, either of single and three phase type, substantially consists in connecting a resistive load or resistors in series between the main power source and the electric motor windings, for a very short period of time, about 0.3 seconds, before the same motor is directly connected to the main power. As soon as the motor starts moving, the current will drop more than 50%; it is also known that an electric motor, if not specially designed, bears a very limited number of starts per hour, usually less than ten, because of the overheating caused by the high current flowing in the windings at each start.

The apparatuses actually available for a resistive start of an electric motor are all based on timers and on counting devices for reducing the number of the motor starts, having relevant costs too high for most applications.

Apart from the known apparatuses mentioned above, no other suitable solution available on the market is presently known.

For an easier understanding of the claimed safety starting apparatus for a resistive start of an electric motor, the following must be considered:

1) the start current $I_S$ (LRA) is given by the formula:

$$I_S = \frac{V}{K(RM + RA)}$$

in which:

$I_S$=Locked Rotor Amps or Start current (LRA)
V=Voltage of the main power source
RM=Ohm value of the motor winding
RA=Ohm value of the resistive load connected in series to the motor winding
K=1 for a single phase motor, and 1.73 for a three phase motor Once the motor starts running, the counteracting electromotive power reduces the current to less than 50%. The voltage across a resistive load, or a fraction thereof connected in series to the motor winding will be correspondingly reduced by the same percentage.

2) Sensing the heating of the resistive load, or of parts of it, because of the thermal inertia phenomena, will easily require more time than what required by a start of an electric motor, which usually is a fraction of a second.

3) The heating of the resistive load will become higher when the turning of the motor for any reason would not start.

The reasons why an electric motor with a resistive start apparatus would not start could be many, comprising a sudden voltage reduction of the main power, a motor load higher then that allowed by the power available, etc.

When running will not occur without a monitoring device, the motor would receive the full main power before starting, which means:

1) LRA current will not be reduced as wanted, and
2) the motor could even be damaged.

OBJECTS OF THE INVENTION

Therefore the objects of the present invention for a resistive start device of an electric motor are:

a) to prevent the connection of the motor to the main power source if the motor does not start rotating when connected to the same main power by a resistive load.

b) to limit the motor starts to the required numbers per hour, to prevent overheating and damages to the same motor windings.

The above mentioned objects of the invention and other ones are obtained with the resistive starting method, and with the safety apparatus for a resistive start of an electric motor described and claimed herein.

The main features of the claimed method for obtaining safety starting conditions with a resistive start apparatus according to the invention, for an electric motor comprise:

1) to sense the voltage across a control resistor provided by a resistive load or part thereof connected in series to a motor winding, before the direct connection to the main power (without a resistive load) will occur;

2) the safety apparatus should also sense the temperature difference between the control resistor of the resistive load, or part thereof, and the ambient in which the same safety device is currently housed.

The start apparatus should also:

a) disconnect the motor from the main power source when the voltage across the resistive load or part thereof does not become lower than a reference voltage, valued on the base of the electrical characteristic of the motor involved, before the direct connection of the motor to the main power is completed;

b) allow a new start only when the differential between the sensed temperature of the resistive load or part thereof, and the ambient temperature will become lower than a prefixed value.

BRIEF DESCRIPTION OF THE INVENTION

According to a first embodiment of the invention, a method for a resistive start of an electric motor has been provided, said electric motor having a winding which is connectable to a main power source (RST) through a resistive load (R1, R2, R3) for a short period of time (t1) before short-circuiting the resistive load (R1, R2, R3) connecting the motor (M) directly to the same main power source (RST) characterized by the steps of:

connecting the motor winding (M) to the power source (RST) through a resistor (R1) for controlling the voltage and temperature of the same resistive load (R1, R2, R3);

detecting the voltage arising across the control resistor (R1) at the starting, before the direct connection of the motor (M) to the main power source (RST) will occur;

detecting the temperature differential (SR−SA) between the ambient and the control resistor (R1) of said electric load (R1, R2, R3); and allowing the motor (M) to run by directly connecting the same motor (M) to the main power source (RST) only when the voltage and the temperature sensed across the control resistor (R1) are decreased and are lower than a pre-established voltage and a temperature differential reference value.

According to a second embodiment of the invention, a method for a resistive start of an electric motor has been provided, said electric motor is firstly connectable to a main power source (RST) by a first contactor (C1) through a resistive load (R1, R2, R3) and subsequently connectable directly to the main power source (RST) by a second delayed contactor (C2) short-circuiting the electric load (R1, R2, R3) characterized by comprising:

an AC-DC feeder (AL);

a control resistor for detecting the voltage and the temperature of the resistive load or part thereof (R1, R2, R3);

a first control switch device (KS) operatively connected to the feeding circuit of the first and second contactors (C1, C2) to control the connection to the AC-DC feeder (AL);

a voltage control device (KV) operatively connected to the control resistor (R1) and to the feeding circuit of the control switch device (KS) to deactivate the same when the voltage sensed across the control resistor (R1), at the time the second contactor (C2) is going to be energized by the AC-DC feeder (AL), is not lower than the initial voltage arising across the same control resistor (R1), at the initial connection of the resistive load (R1, R2, R3) to the power source (RST) by the first contactor (C1) of the safety device; and a temperature control device (KT) for sensing the differential temperature between the ambient and the control resistor (R1) of the resistive load (R1, R2, R3), to deactivate the first safety switch device (KS) only when the starting procedure of the electric motor (M) has not been completed with the activation of the second contactor (C2) of the safety device, and when the sensed differential temperature is higher then a prefixed value;

said temperature control device (KT) being also connected to the feeding circuit of the voltage sensing device (KV) to deactivate the same once it has been activated when the electric motor (M) fails to start.

According to a further embodiment of the invention, an apparatus for a safety resistive start of an electric motor has been provided, by which the motor may be connected to a main power source through a resistive load by a first contactor, and directly connected to the main power by a second contactor short circuiting the resistive load, where the second contactor will be activated with a prefixed time delay from the activation of the first contactor mentioned above; the apparatus comprising:

an AC-DC power supply, with stabilized DC voltage when necessary;

a control resistor for detecting the temperature and voltage across said resistive load;

a control switch device which, when activated or powered will allow to activate the first and second contactors to connect the motor to said main power source;

a voltage actuated control device (KV) operatively connected to said voltage control resistor, which:

a) will deactivate the control switch device when the voltage sensed across the control resistor, would be higher than a prefixed value at the time the second contactor for short circuiting the resistive load is activated; and b) will prevent reactivation of said control switch device till the temperature control device has sensed the temperature differential between the control resistor and the ambient; and a temperature control device for sensing the differential temperature between the control resistor of the resistive load and the ambient temperature, which temperature control device is made such as:

c) to allow a new start of the motor only, if the sensed difference of the temperature has not decreased to the prefixed value;

d) to reactivate the voltage control device only when sensing a temperature differential over the said prefixed value.

For all the remaining time during normal running of the motor, while the second contactor is activated, the temperature control device is deactivated.

BRIEF DESCRIPTION OF THE DRAWING

The invention will be now described with reference to the accompanying drawings, in which.

DETAILED DESCRIPTION OF THE INVENTION

Figure 1:
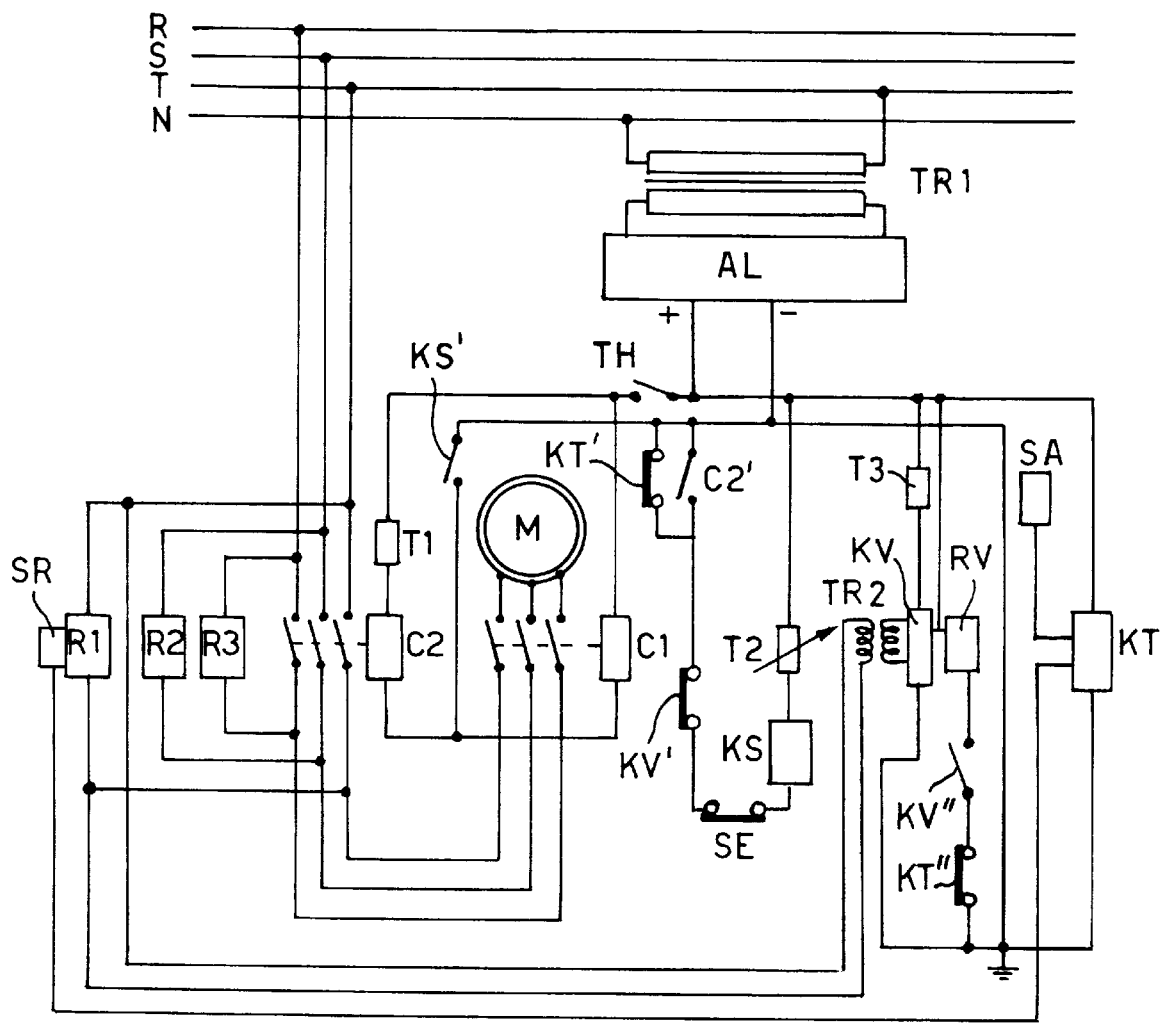
FIG. 1 shows a general electrical wiring of the apparatus according to the invention.

The several devices which appear in FIG. 1 are to be considered as generally known and to be realisable by any technician on the base of what generally known in the present technical field as hereafter described.

Looking to FIG. 1, reference M indicates an electric motor, for example a three phase motor having a short circuit rotor, and stator windings which can be connected by a first contactor C1 to a main power source RST through a resistive load comprising the resistors R1-R2-R3 in series with the motor stator coils, while a second contactor C2 will short circuit the resistive load R1-R2-R3 connecting the electric motor M directly to the main power source RST.

A first timer T1 will allow the contactor C2 to be energized, only after a very short time t1, less than one second (see FIG. 2), counted from the time the to contactor C1 has been powered by a power supply AL.

By this way the electric motor M will be initially fed with a reduced voltage value and therefore with a reduced starting current (LRA) because of the resistive load R1-R2-R3.

After the delay produced by the timer T1, the contactor C2 will be energized and will supply to motor M the full main power while the current will be slightly higher than the working current in the first few seconds only.

AL in FIG. 1 indicates an AC-DC power supply, stabilized when necessary in respect to fluctuations of the main power voltage, available for the devices later described, which is connected by a safety transformer TR1 to the main power source. TH indicates a control switch to start and stop the motor M.

The apparatus of FIG. 1 furthermore comprises a control switch device KS made by a relay, optionally including a time delay device T2 to avoid simultaneous starts of more than one motor if a black-out should occur, connected to the DC power supply AL through:

an external safety contact switch SE when available;

a normally closed (n.c.) auxiliary contact KV' belonging to the voltage control device KV for sensing the voltage across control resistor R1 of the resistive load, or a fraction thereof, as said hereafter;

a n.c. auxiliary contact switch KT' of a temperature sensing device KT for monitoring the temperature of the control resistor of the resistive load, or a fraction thereof, as said later;

reference C2' of FIG. 1 indicates an auxiliary switch contact of contactor C2 which will prevent KS device to be deactivated by opening of KT once the start procedure of the motor M has been completed.

KV of FIG. 1 indicates a voltage control device for monitoring the voltage across the resistive load, in the present case the control resistor R1 or a fraction of the same, through a safety transformer TR2.

The device KV will energize a relay RV at the time t3 established by a timer T3, just before the timer T1 is activating C2, if the voltage across the control resistor R1, or a fraction of R1, is not lower than the value of the voltage sensed across the control resistor R1 at the initial start, or a pre-established reference value. Once energized, the relay KV will be kept energized by its contact KV" till n.c. KT" contact of KT device will remain in the closed position. If and when energized, KV through KV' will deactivate KS before C2 has been activated, and the entire motor starting procedure would be stopped by the opening of the contact KS'.

KT device is a differential temperature control device for monitoring the ambient temperature by the sensor SA, and the temperature of the control resistor R1 and more generally of the resistive load, or a fraction thereof, by the sensor SR, and will activate the relay RV when the temperature difference between resistor R1, or the resistive load, and the ambient becomes higher than a wanted value. Therefore RV, after a failed start of the motor M, will be deenergized by the opening of the n.c. contact KT" and will be ready for future voltage controls. KT" will open when KT is sensing a temperature increase of the control resistor R1 or fraction thereof, over a prefixed value (which happens after every start). At the same time KT through the n.c. contact KT' will avoid any new start of the motor M by keeping deenergized KS so long as the R1 temperature does not decrease to the prefixed value.

By changing the temperature differential sensed by KT, the timing between one start and the following one of the motor, will be varied to the desired value.

OPERATIONAL DESCRIPTION

Figure 2:
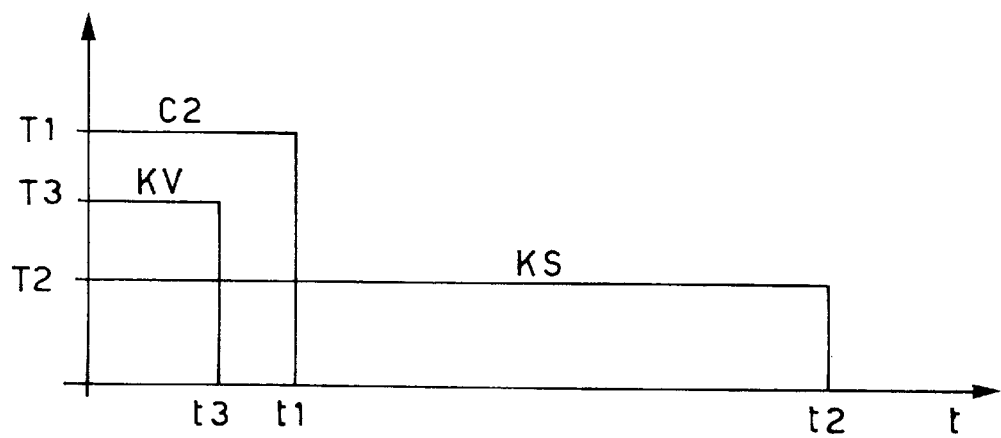
FIG. 2 is a diagram of the timing at which the apparatus of FIG. 1 would work.

See FIGS. 1 and 2: as soon the starting apparatus is powered, AL will supply the DC power, and KS will be energized.

By closing the starting switch TH, contactor C1 will immediately connect the motor M to the main power source RST with the resistive load R1-R2-R3 in series and the same motor M will make to run, which means with a reduced LRA current as previously described.

After the time t3 from the powering of the motor by C1, about 0.3 seconds, the timer t3 will activate KV control device for sensing the voltage across the control resistor R1 of the resistive load, or part thereof. If the sensed voltage has not decreased below a determined value, the motor does not start to run and KV, being activated, will stop the powering to the motor by opening the n.c. KV' contact and consequently the KS' contact. KV" will keep the motor M stopped, by keeping KV energized till KT will not feel the overheating of the resistive load, and KT" will not reactivate the voltage sensing device KV.

At the time KV is reactivated, the n.c. KT' contact opens and by keeping KS deactivated does not allow any new motor start to occur so long as the resistive load R1, R2, R3 has not cooled enough. This means that the timing between one start and the following one is easily adjusted by changing the differential temperature control value of KT between ambient and the resistive load.

From what has been said and shown with the drawing it looks evident the method and the apparatus will grant that the motor would not start with a starting current higher than that expected, and the number of motor starts in one hour will never be more then the numbers of starts specified by the motor manufacturer by adjusting the temperature differential.

What is described and shown with reference to the included drawing was said as a simple example of application of the method claimed by the invention and modifications and variants of the several devices would not be outside the claimed method and start apparatus.

What we claim is:

1. A safety device for the resistive start of an electric motor according to which the motor is firstly connectable to a main power source by a first contactor through a resistive load and subsequently connectable directly to the main power source by a second delayed contactor short-circuiting the electric load, the safety device comprising:

an AC-DC feeder;

a control resistor for detecting the voltage and the temperature of the resistive load;

a first control switch device operatively connected to the feeding circuit of the first and second contactors to control the connection to the AC-DC feeder, said control switch device comprising an adjustable time delay device;

a voltage control device operatively connected to the control resistor and to the feeding circuit of the control switch device to deactivate the same when the voltage sensed across the control resistor, at the time the second contactor is going to be energized by the AC-DC feeder, is not lower than the initial voltage arising across the same control resistor, at the initial connection of the resistive load to the power source by the first contactor of the safety device; and a temperature control device for sensing the differential temperature between the ambient and the control resistor of the resistive load, to deactivate the first safety switch device when a new starting procedure of the electric motor takes place with the activation of the second contactor of the safety device, and when the sensed differential temperature is higher then a prefixed value, said temperature control device being also connected to the feeding circuit of the voltage sensing device to deactivate the same once it has been activated when the electric motor fails to start.

2. A method for controlling a resistive start of an AC electric motor of the type comprising a motor winding which may be firstly connected to an AC voltage power source (RST) through a resistive load (R1, R2, R3), and successively directly connected to the AC voltage power source (RST) by actuation of a control device (C2) after a starting time (t1) has lapsed, comprising the steps of:

providing a voltage detecting device (KV, RV) and a voltage control resistor (R1) of the resistive load (R1, R2, R3) operatively connected to the voltage detecting device (KV, RV);

detecting the voltage arising across the control resistor (R1) during the starting time (t1), and before the direct connection of the motor winding to the AC voltage power source (RST) occurs; and directly connecting the motor winding to the AC voltage power source (RST) allowing the motor to run, when the voltage sensed by the voltage detecting device (KV, RV) across the control resistor (R1) has been reduced to a value lower than the voltage arising across the control resistor (R1) at the beginning of the starting time.

3. The method of claim 2, further comprising the steps of detecting a temperature differential between ambient temperature and a temperature of the control resistor, and allowing the motor to start anew only when the detected temperature differential is less than a reference value.

4. The method of claim 3, wherein a time between starts of the motor is a function of the time until the detected temperature differential is less than the reference value, and further comprising the step of adjusting the time between starts of the motor by adjusting the reference value.

5. An apparatus for controlling the resistive start of an AC electric motor of the type comprising a motor winding connectable to an AC voltage power source (RST) directly and through a resistive load (R1, R2, R3), the apparatus comprising:

a voltage control resistor (R1) of said resistive load (R1, R2, R3);

a first switch device (C1) for connecting the motor winding to the AC voltage power source (RST) through the resistive load (R1, R2, R3);

a second switch device (C2) for short-circuiting the resistive load (R1, R2, R3) for directly connecting the motor winding to the AC voltage power source (RST); and a voltage control device (KV, RV) to detect the voltage arising across said control resistor (R1) during a starting time, said voltage control device (KV, RV) being constructed and arranged in a feeding circuit of said first and second contactors (C1, C2) to disconnect the motor winding from the AC voltage power source (RST) so long as the voltage sensed across the control resistor (R1) does not reduce to a voltage value lower than the voltage arising across said control resistor (R1) at the beginning of the starting time.

6. The apparatus of claim 5, further comprising a sensor for detecting a temperature differential between ambient temperature and a temperature of the control resistor, and a temperature control device for disconnecting the motor from the AC voltage power source so long as the detected temperature differential is not less than a reference value.

7. The apparatus of claim 5, wherein said voltage control device comprises an adjustable time delay device.

* * * * *